US008204054B2

(12) United States Patent
Ajima et al.

(10) Patent No.: US 8,204,054 B2
(45) Date of Patent: Jun. 19, 2012

(54) SYSTEM HAVING A PLURALITY OF NODES CONNECTED IN MULTI-DIMENSIONAL MATRIX, METHOD OF CONTROLLING SYSTEM AND APPARATUS

(75) Inventors: Yuichiro Ajima, Kawasaki (JP); Tomohiro Inoue, Kawasaki (JP); Shinya Hiramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 12/706,137

(22) Filed: Feb. 16, 2010

(65) Prior Publication Data

US 2010/0238944 A1  Sep. 23, 2010

(30) Foreign Application Priority Data

Mar. 18, 2009  (JP) ................................. 2009-065892

(51) Int. Cl.
*H04L 12/56* (2006.01)
(52) U.S. Cl. .......................... 370/389; 370/392; 370/401
(58) Field of Classification Search .................. None
See application file for complete search history.

(56) References Cited

U.S. PATENT DOCUMENTS

| | | | | |
|---|---|---|---|---|
| 5,737,628 | A | * | 4/1998 | Birrittella et al. ............... 712/11 |
| 5,898,826 | A | * | 4/1999 | Pierce et al. .................... 714/4.2 |
| 2002/0114031 | A1 | | 8/2002 | Yamada |
| 2005/0195808 | A1 | * | 9/2005 | Chen et al. ..................... 370/386 |
| 2008/0151909 | A1 | * | 6/2008 | Scott et al. .................... 370/400 |
| 2009/0274157 | A1 | * | 11/2009 | Vaidya et al. ................. 370/400 |
| 2011/0283038 | A1 | * | 11/2011 | Takagi ........................... 710/317 |

FOREIGN PATENT DOCUMENTS

JP  2002-247038  8/2002

OTHER PUBLICATIONS

Dally, et al., "Deadlock-Free Message Routing in Multiprocessor Interconnection Networks", IEEE Transactions on Computers, vol. C-36, No. 5, May 1987.

* cited by examiner

*Primary Examiner* — Robert Scheibel
*Assistant Examiner* — Duc Duong
(74) *Attorney, Agent, or Firm* — Staas & Halsey LLP

(57) ABSTRACT

A system has a plurality of nodes connected in a multi-dimensional matrix and having node addresses, respectively, each of the nodes having a processor, and a router for transmitting a request packet to a node adjacent to its own node located in n+1th dimension when the address of nth dimension of its own node is matched to the address of nth dimension of the target node, transmitting a response packet to a node adjacent to its own node located in nth dimension when the address of n+1th dimension of its own node is matched to the address of n+1th dimension of the response packet, wherein the router terminates a request packet when the address of the request packet is fully matched to the node address of its own node in all the dimensions, transfers the data conveyed by the request packet to the processor of its own node for processing.

17 Claims, 14 Drawing Sheets

⟵⟶ REQUEST CHANNEL
⟵------⟶ RESPONSE CHANNEL

SYSTEM HAVING A PLURALITY OF NODES CONNECTED IN MULTI-DIMENSIONAL MATRIX, METHOD OF CONTROLLING SYSTEM AND APPARATUS

CROSS-REFERENCE TO RELATED APPLICATION

This application is based upon and claims the benefit of priority of the prior Japanese Patent Application No. 2009-065892, filed on Mar. 18, 2009, the entire contents of which are incorporated herein by reference.

FIELD

The present art relates to a system including a plurality of computing nodes, method of controlling a system and an apparatus arranged at each computing node in the system.

BACKGROUND

Massively parallel computers each including tens of thousands of connected processors draw attention in the high-performance computing (HPC) field. A massively parallel computer including tens of thousands of nodes is designed so that a hardware cost per node is constant regardless of the scale of the system. In an internode connection network of nodes, a direct network is typically used to interconnect one node to another. The hardware cost of the direct network is determined by the number of ports on each node, and remains constant regardless of the scale of the system. One of the multidimensional mesh and the multidimensional torus is typically used as a connection topology of the direct network in a massively parallel computer formed of tens of thousands of nodes.

In such a system, deadlock in which a communication interruption is caused by a request to transfer circularly a plurality of packets has to be avoided. As a technique to avoid such a deadlock, the dimension order routing is known. The dimension-order routing determines the dimension order of communication lines. A routing technique is disclosed (William J. Dally, Charles L. Seitz, "Deadlock-Free Message Routing in Multiprocessor Interconnection Networks," *IEEE TRANSACTIONS ON COMPUTERS* Vol. C-36, May 1987). In accordance with the disclosed routing technique, dual virtual channels having a high value and a low value as channel numbers are allocated to each node, and the channel numbers of transfer destinations are arranged in an ascending order or a descending order.

If a system having a scale of tens of thousands of nodes is shut down for maintenance each time any node malfunctions, the uptime of the system is reduced. Fault robustness is important on such a system. Even if some of the nodes are at fault, the system with the fault robustness preferably maintains communications with the other nodes used. However, the communication line is fixed beforehand in the dimension order routing, and if one node is at fault, the communication performed via that node becomes difficult.

SUMMARY

According to an aspect of an embodiment, a system includes a plurality of nodes connected in a multi-dimensional matrix and having node addresses, respectively, each of the nodes including a processor for processing data and producing a request packet and a response packet, and a router for receiving a request packet having an address of a target node and data from any other node adjacent to its own node, transmitting the request packet to a node adjacent to its own node located in nth dimension when a portion of the node address in nth dimension of its own node is not matched to a portion of the address in nth dimension of the request packet, transmitting the request packet to a node adjacent to its own node located in n+1th dimension when the address of nth dimension of its own node is matched to the address of nth dimension of the request packet, receiving a response packet having an address from any other node adjacent to its own node, transmitting the response packet to a node adjacent to its own node located in n+1th dimension when a portion of the node address of n+1th dimension of its own node is not matched to a portion of the address of n+1th dimension of the response packet, and transmitting the response packet to a node adjacent to its own node located in nth dimension when the address of n+1th dimension of its own node is matched to the address of n+1th dimension of the response packet, wherein the router terminates a request packet when the address of the request packet is fully matched to the node address of its own node in all the dimensions, transfers the data conveyed by the request packet to the processor of its own node for processing, receives a response packet produced by the processor of its own node, and transmits the produced response packet to an adjacent node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 11:
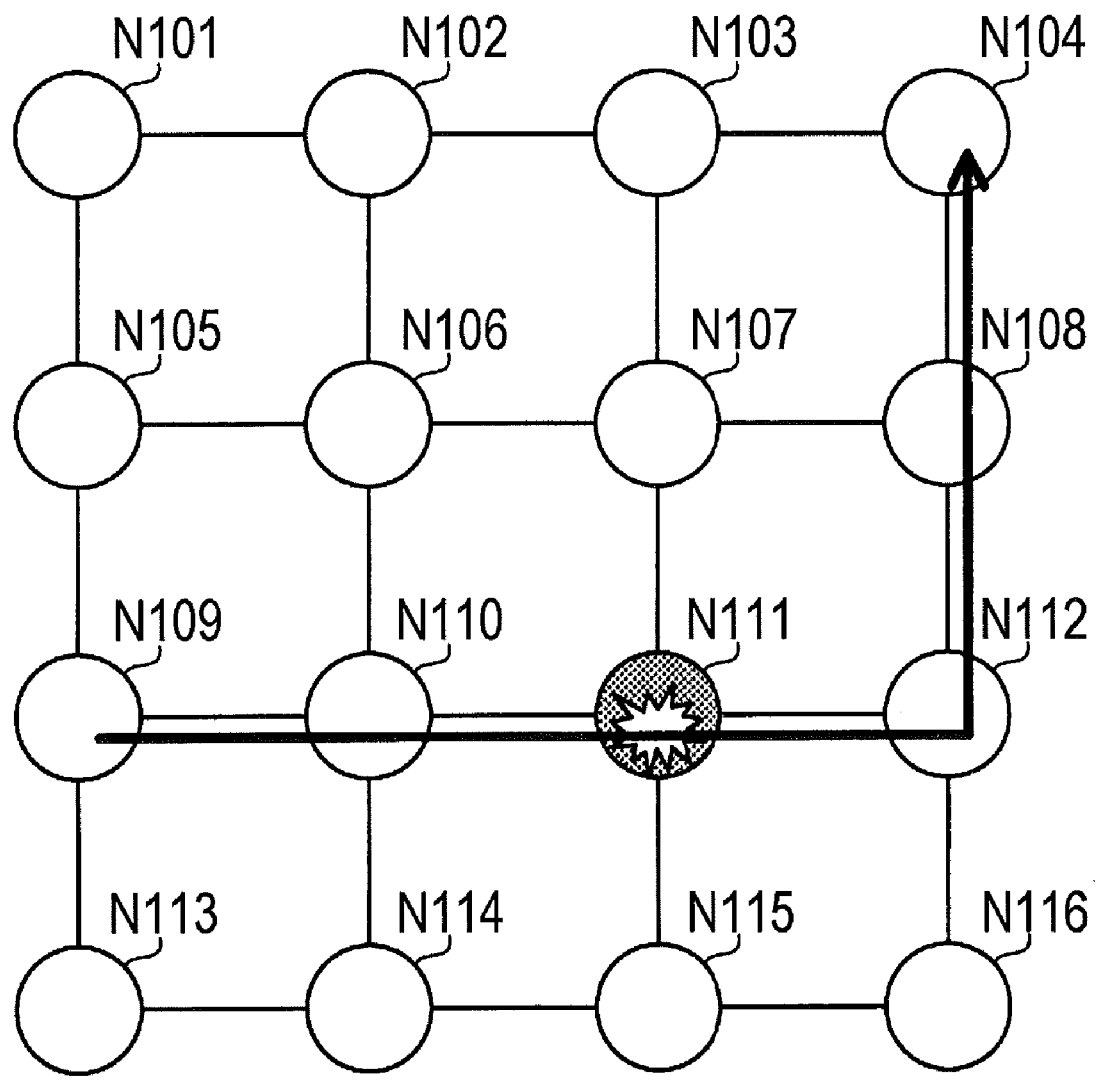
FIG. 11 illustrates a mesh network with a fault occurring therewithin.

FIG. 11 illustrates a node at fault in a mesh network.

In a parallel computer illustrated in FIG. 11, computer nodes (hereinafter simply referred to as nodes) N101-N116 are interconnected in a two-dimensional 4×4 mesh network.

The dimension order routing is performed in the mesh network. A routing operation is performed in an x direction (a horizontal direction in FIG. 11) first, followed by the routing operation in a y direction (vertical direction in FIG. 11). For example, a packet is now transmitted from the node N109 to the node N104. The packet is routed from the node N109, through the nodes N110, N111, and N112, and N108, and then to the node N104.

In the dimension order routing, one transmission path of the packet is determined based on a combination of a transmission mode and a reception mode. If one node fails in such a mesh network, all the communications routed through that node become incapacitated.

Figure 1:
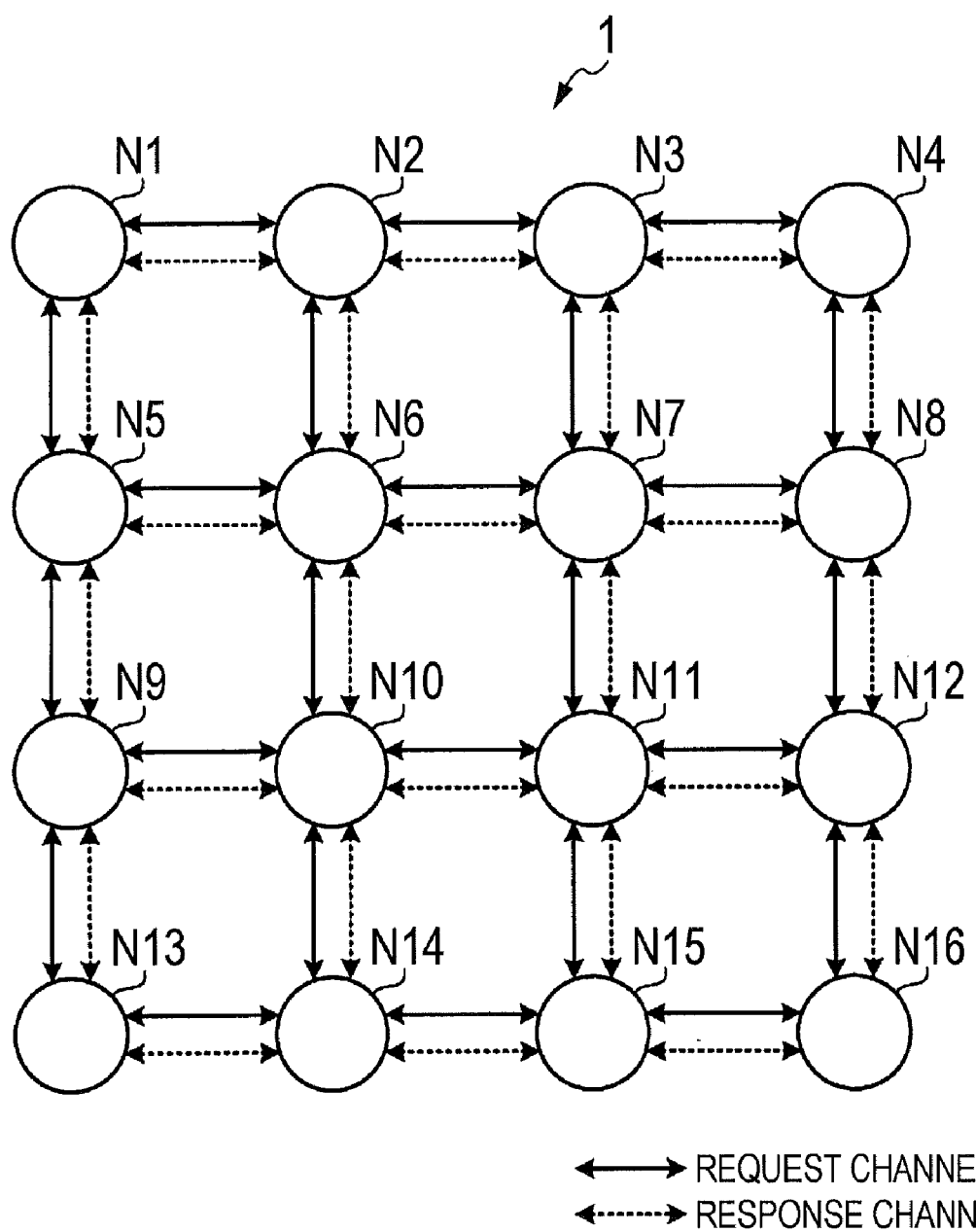
FIG. 1 generally illustrates a parallel computer in accordance with a first embodiment of the present invention.

To perform parallel calculation on the nodes, nodes performing the same job communicate with each other. If a fault causes a combination of nodes to fail to communicate with each other, the scale of a node group executing the job becomes smaller. For example, if the node N111 fails as illustrated in FIG. 1, the following three partitioning methods are contemplated to partition the nodes into groups that enable the communication to be performed.

In accordance with a first partitioning method, a 2×4 node group on the upper side and a 1×4 node group on the lower side are set with respect to the row including the failed node N111. More specifically, the upper node group includes the nodes N101-N108, and the lower node group includes the nodes N113-N116.

In accordance with a second partitioning method, a 4×2 node group on the left-hand side and a 4×1 node group on the right-hand side are set with respect to the column including the failed node N111. More specifically, the left-hand side group includes the nodes N101, N102, N105, N106, N109, N110, N113, and N114, and the right-hand side group includes the nodes N104, N108, N112, and N116.

In accordance with a third partitioning method, one group including 3×3 nodes excluding the row and the column including the failed node N111 is set up. More specifically, this node group includes the nodes N101, N102, N104-N106, N108, N113, N114, and N116.

Figure 12:
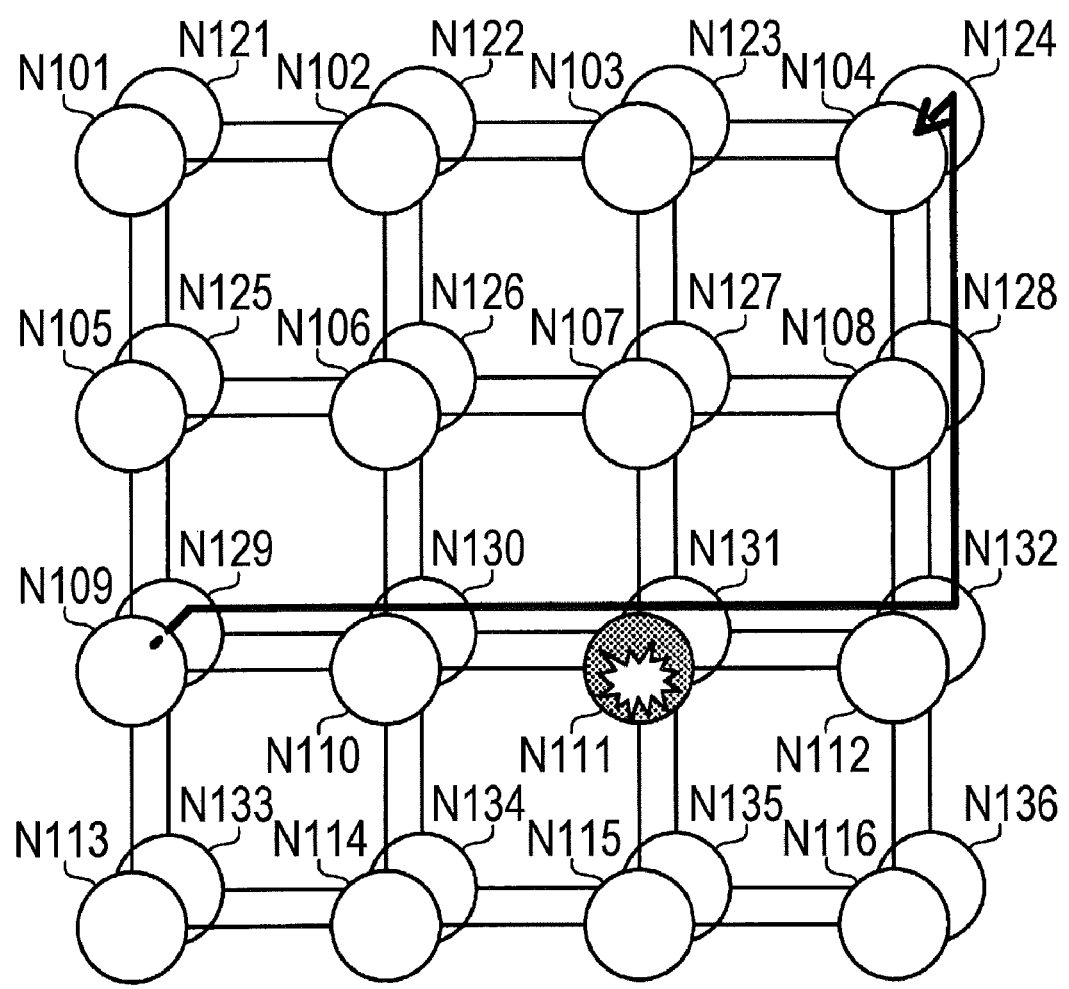
FIG. 12 illustrates multiplexed mesh networks.

As a remedial step to the disconnection of the node group caused by a node fault, the multiplexing of multidimensional mesh networks or multidimensional torus networks is contemplated. FIG. 12 illustrates an example of a multiplexed mesh network.

FIG. 12 illustrates a two-dimensional 4×4 mesh network in which two communication planes are multiplexed. In the mesh network, one communication plane includes nodes N101-N116 and the other communication plane includes nodes N121-N136, and the corresponding nodes are also mutually connected to each other between the two planes.

A two-dimensional 4×4 mesh network is constructed of each of the two nodes mutually connected between the communication planes. If a node on one communication plane fails, communications are maintained using the node of the other communication plane connected to the failed node.

It is now assumed in FIG. 12 that the node N111 fails in the path through which a packet is transmitted from the node N109 to the node N104. Communications are maintained by causing the packet to be routed via nodes on the other communication plane corresponding to the packet communication path. For example, the packet is routed via the nodes N109, N129, N130, N131, N132, N128, N124, and N104 in that order. The packet is thus transferred from the node N109 to the node N104. If a node on the one communication plane fails in this way, all the nodes on the other communication plane remain operational, and the node group is not disconnected.

Japanese Laid-open Patent Publication No. 2002-247038 discloses a fault recovery method in the mesh network. In accordance with the disclosed method, a currently operative system and a backup system are dynamically arranged to form a ring net, and traffic is routed along the backup system if the currently operative system fails.

Remote direct memory access (RDMA) communications are used in the HPC field in order to shorten the network processing time of a processor. Communication requesting a memory at a remote node to write data thereon is referred to as "put communication," and communication requesting the memory to read data therefrom is referred to as "get communication."

In the RDMA communication, a network interface of a remote node can be requested to read data from and write data to the memory of that node. In response to the request, a direct memory access (DMA) transfer operation is performed between the network interface and the memory during the writing and reading of the memory. Memory read and write operations are thus performed without imposing a process load on the processor of each node. As a result, each processor in the parallel computer performs the parallel processing at a high efficiency.

Figure 13:
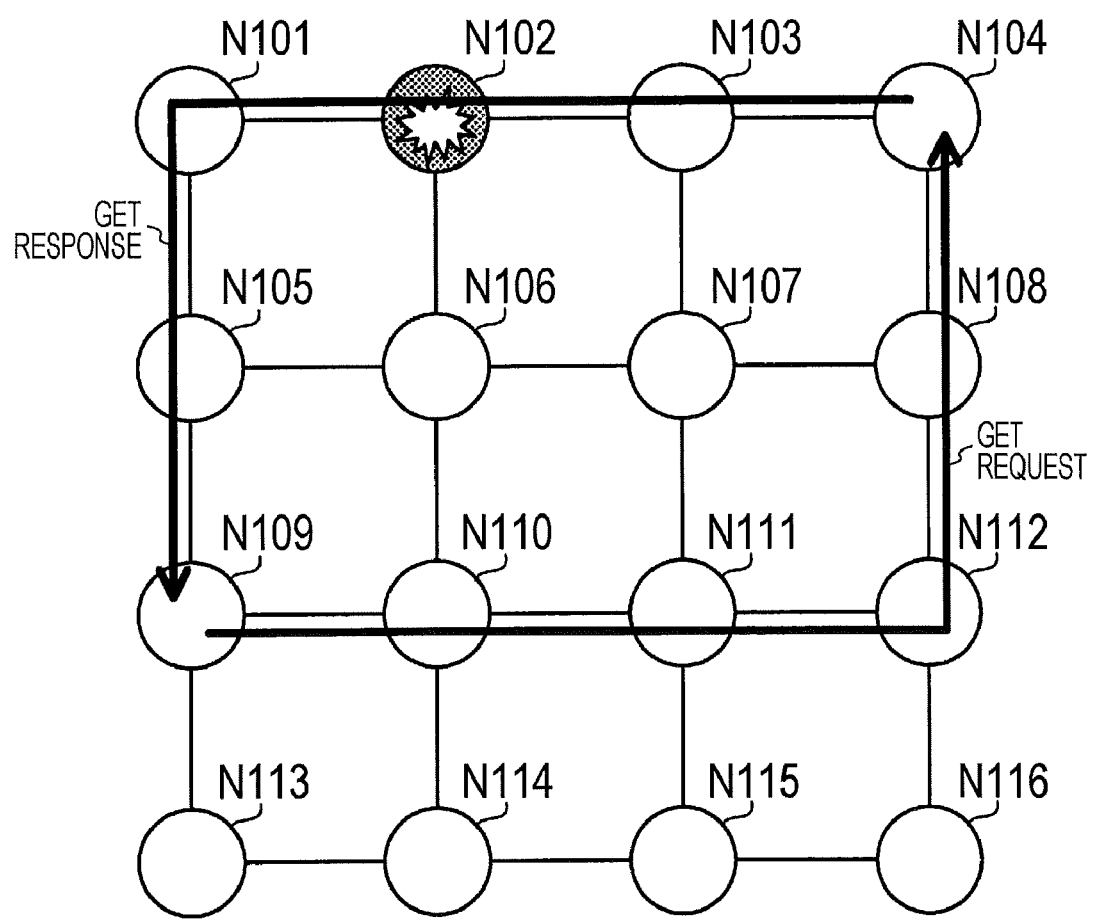
FIG. 13 illustrates the path of a packet wherein a get communication is performed.

FIG. 13 illustrates a packet routing in the get communication.

In the get communication, a response communication operation is performed in order to send data read from the memory to a requesting party. If the dimension order routing is performed, a get request packet and a response packet are routed along different paths. For example, as illustrated in FIG. 13, the get request is transmitted from the node N109 to the node N104. The get request packet is routed through the nodes N109, N110, N111, N112, N108, and N104 in that order. On the other hand, the get response packet from the node N104 is routed through the nodes N104, N103, N102, N101, N105, and N109 in that order.

The paths of the get request packet and the get response packet are different, and a node might fail on one path. For example, if a node on the path of the get response packet fails, a transmission source node of the get request fails to receive the requested data.

Figure 14:
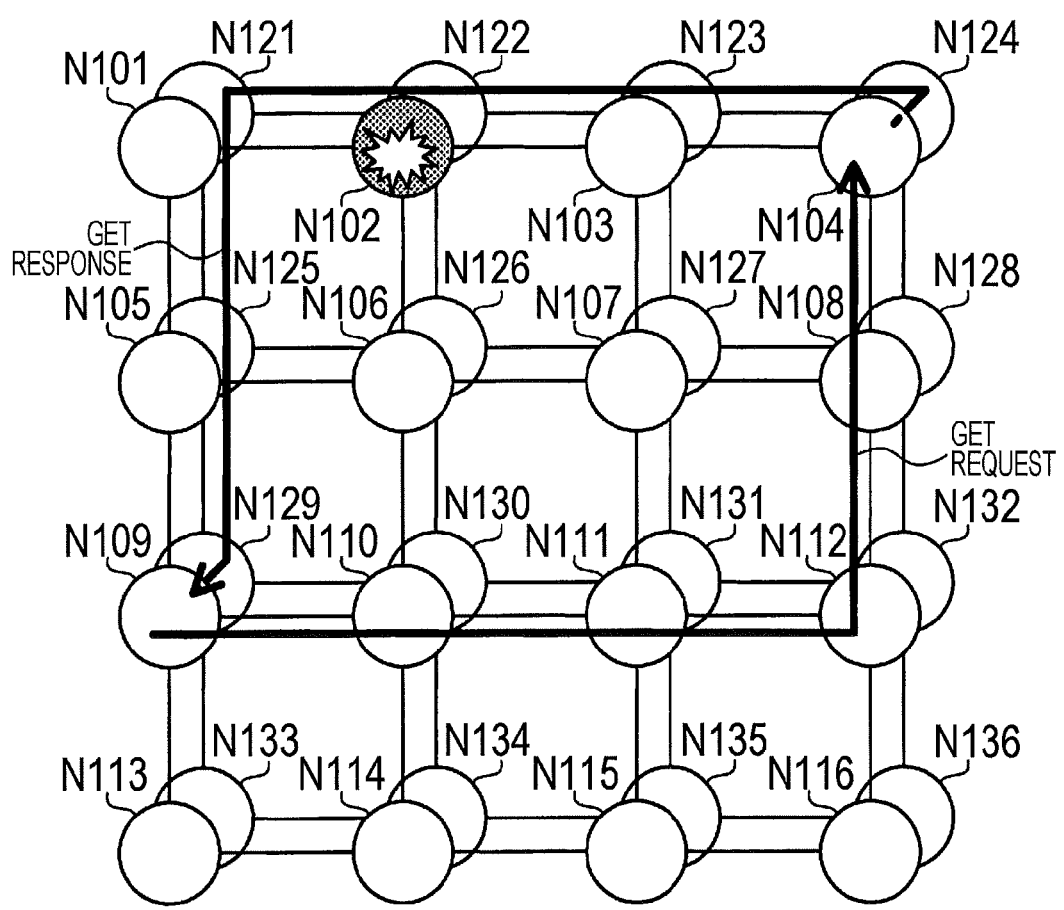
FIG. 14 illustrates multiplexed mesh networks in which a fault occurs in a response path.

Such a problem may be overcome by multiplexing mesh networks. FIG. 14 illustrates a fault that occurs in the response path in the multiplex network. Referring to FIG. 14, a fault occurs at a node along the response path in the same communication plane as the communication plane of the requesting path. By switching the communication planes on the response path only, the read requested data is routed to the request source node.

With this method, the node having received the get request selects an optimum communication plane so that the response packet path bypasses the failed node. The dimension order routing has the great advantage that each node can easily determine the transmission line. In order to select an optimum response path, the node having received the get request performs a complex process. If such an optimum path selection function is implemented using a hardware circuit, the circuit becomes complex and large in scale.

Communications are preferably maintained in the dimension order routing of one of the multidimensional mesh network and the multidimensional torus network in the event of a node fault. Particularly, when a packet requesting a response, such as a get request packet, is transmitted, it is preferred that a requesting node reliably receives a response packet even if a fault occurs in the path of the response packet.

In order to provide the fault robustness to respond reliably to a packet requesting a response, the communication planes are multiplexed as previously described so that an optimum path of the response packet bypassing a failed node is selected. A complex process is performed to select the optimum path. The circuit scale of the system is enlarged and the manufacturing costs of the system is increased to perform such a complex process.

The embodiments are described below with reference to the drawings.

First Embodiment

FIG. 1 generally illustrates a parallel computer 1 of a first embodiment.

The parallel computer 1 illustrated in FIG. 1 includes an information processing system of a plurality of computing nodes (hereinafter simply referred to as nodes) connected via a network. Processors in the nodes perform predetermined processes in parallel. The parallel computer 1 of the first embodiment includes sixteen nodes N1-N16. The nodes N1-N16 are connected in a two-dimensional 4×4 mesh via an optical fiber. A mesh network is thus constructed. A system has a plurality of nodes connected in a multi-dimensional matrix and having node addresses, respectively.

In the network, each node is connected to nodes adjacent thereto in an x direction (horizontal direction in FIG. 1) and a y direction (vertical direction in FIG. 1) via at least two virtual channels. Here, one virtual channel is referred to as a "request channel," and the other virtual channel is referred to as a "response channel."

If a packet is transmitted from one node via one virtual channel in the network, the packet is routed to a destination via the same virtual channel in principle. The request channel and the response channel perform dimension order routing operations in mutually opposite directions. For example, the routing operation is performed in the x direction first, followed by the routing direction in the y direction.

In order to transmit a packet from the node N9 to the node N4 via the request channel, the packet is routed from the node N9 through the nodes N10, N11, and N12 in that order, and then to the nodes N8 to node N4. In order to transmit a packet from the node N9 to the node N4 via the response channel, the packet is routed from the node N9 through the nodes N5 and N1, and then through the nodes N2, N3, and N4 in that order.

When one node communicates with another node in the network, separate virtual channels are used depending on the transmission direction of data. For example, the request channel may be used to route data from one node to the other node while the response channel may be used to route data from the other node to the one node. In such an operation, the data transmission path remains unchanged regardless of the transmission direction of data.

Taking advantage of the above-described property, a response packet responsive to a process request packet requesting a response to a request source node is reliably routed as described with reference to FIG. 2.

Figure 2:
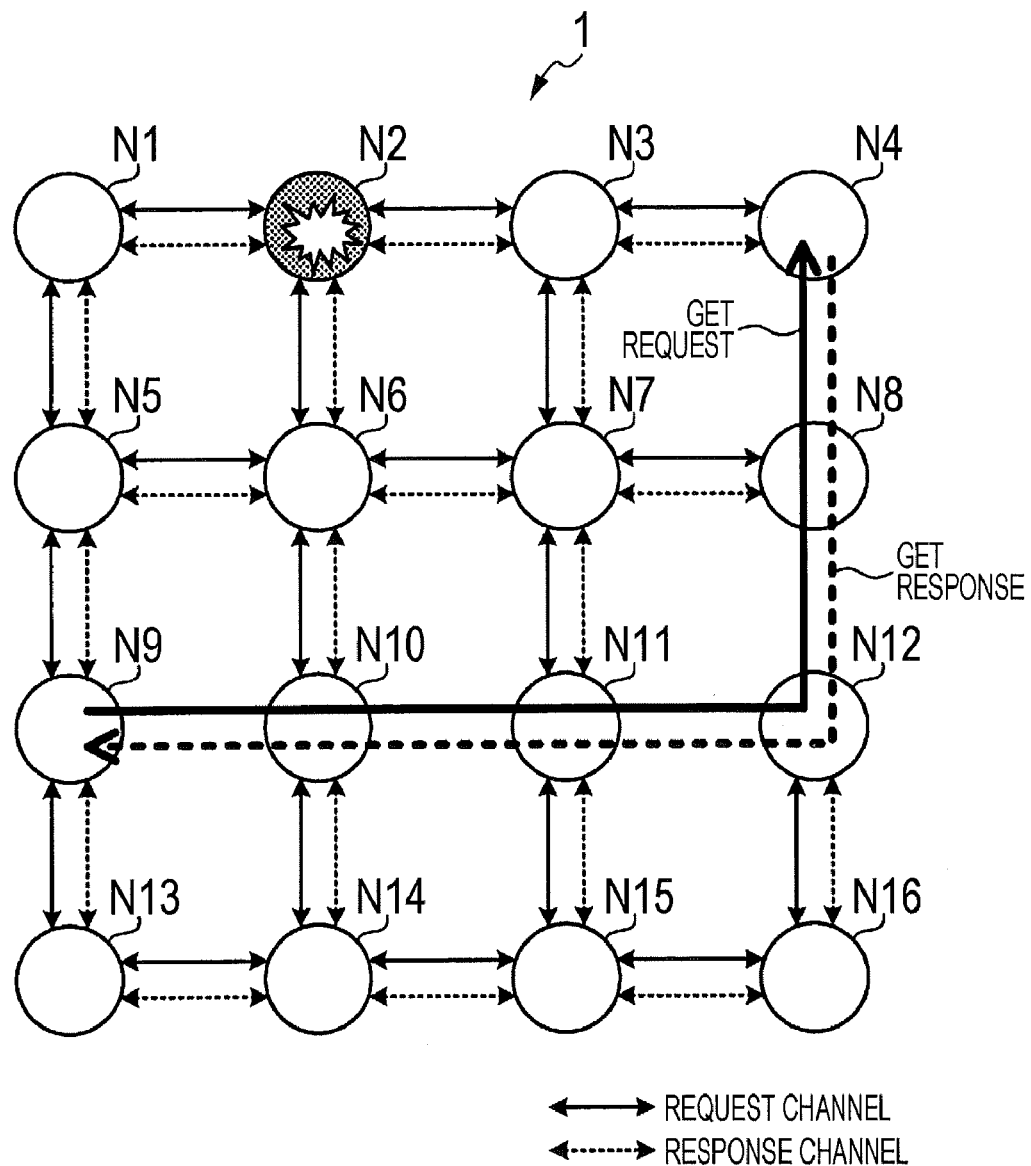
FIG. 2 illustrates transmission paths of a process request packet and a response packet.

FIG. 2 illustrates a packet transmission path of the process request packet and the response packet.

In accordance with the first embodiment, the get communication is applied as the communication that responds to the request source node. The get communication is used to read data from a memory at a request destination node using the RDMA technique.

In the get communication, the request destination node reads data from the memory through a DMA operation without imposing workload on a central processing unit (CPU) as an executing entity of the parallel processing, and the read data is then routed to the request source node. The communication responding to the request source node, such as the get communication, has preferably the property that a workload at the request destination node is light and that a response is returned within a short period of time.

As illustrated in FIG. 2, a get request packet is transmitted from the node N9 to the node N4. The node N9 transmits the get request packet via the request channel. The get request packet is routed through the nodes N10, N11, N12, N8, and N4 in that order.

The node N4 having received the get request packet reads requested data from the memory connected to the node N4 through the DMA sequence operation. A get response packet containing the data is then transmitted from the node N4 to the node N9 via the response channel. The get response packet is thus routed through the nodes N8, N12, N11, N10, and N9 in that order. In other words, the get response packet is routed in the opposite direction but along the same path as the path of the get request packet.

If the get request packet is routed through the same virtual channel as the virtual channel of the get response packet, the get response packet is routed from the node N4 to the node N9 via nodes N3, N2, N1, N5, and N9 in that order. If the node N2 fails, the get response packet fails to reach the node N9 although the response process is normally performed at the node N4.

To overcome such a problem, the multiplexing of the communication planes as discussed with referent to FIG. 14 is contemplated. However, this technique means a complex process, because a node having received the get request packet determines an optimum response route path accounting for the communication plane.

In contrast, the transmission path of the get request packet and the transmission path of the get response packet remains the same if the get response packet is transmitted via the response channel as illustrated in FIG. 2. If the get request packet reaches the request destination node, the get response packet is definitely transmitted back to the request source node. The fault robustness of the get communication is thus increased.

The request destination node simply transmits the get response packet over the same communication plane as the communication plane of the get request packet. For example, if the request destination node receives the get response packet from another node connected thereto, the request destination node determines the same node as a transmission target of the get response packet, and only changes the virtual channel for transmission. The process for determining the response transmission path is simplified, and an increase in the scale of the process circuit of the system and an increase in the manufacturing costs of the system are controlled.

The structure of each node and the process sequence are specifically described below.

Figure 3:
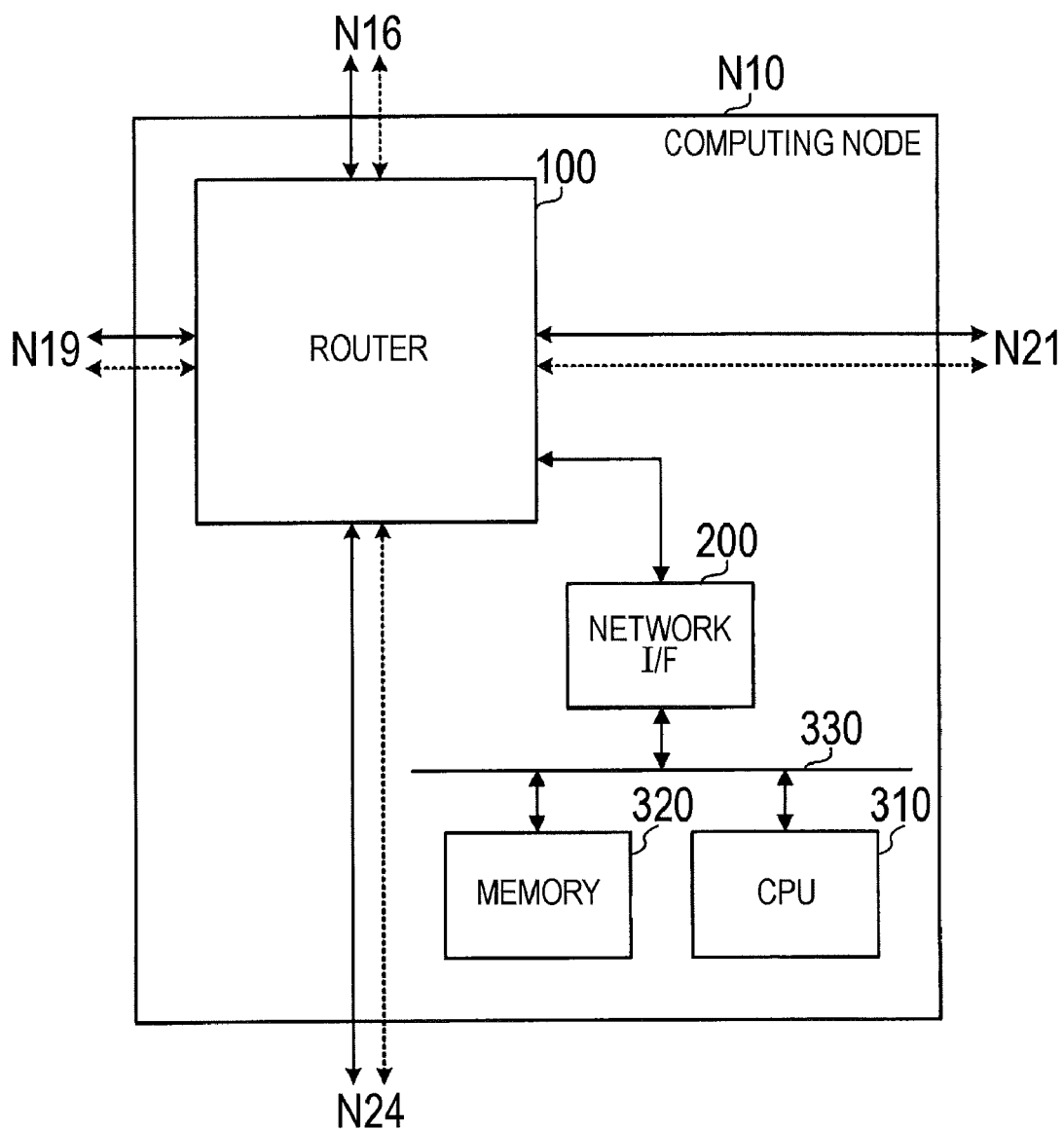
FIG. 3 illustrates an internal structure of a node.

FIG. 3 illustrates an internal structure of the node.

The internal structure of the node N10 illustrated in FIG. 3 is identical to that of the nodes N6, N7, and N11. The nodes N1-N5, N8, N9, and N12-N16 are basically identical in structure to the node N10 except the number of communication ports responsive to the other nodes connected thereto.

As illustrated in FIG. 3, the node N10 includes router 100, a network interface (I/F) 200, CPU 310, and memory 320. The network interface 200, the CPU 310, and the memory 320 are mutually interconnected to each other via a bus 330. The network interface 200, the CPU 310, and the memory 320 form a processor element (PE).

The router 100 routes a packet through the mesh network. Upon receiving a packet from another node connected to the N10 (hereinafter referred to as an "adjacent node"), the router 100 determines the destination of the packet. If the destination is another node, the router 100 determines an adjacent node as the destination in accordance with the dimension order responsive to the received virtual channel, and then transmits the packet to the adjacent node. If the destination is the node N10, the received packet is output to the network interface 200 from the router 100. In an actual internode communication, the packet is split into flits as smaller data units before being transmitted.

The router 100 can also receive through the network interface a packet containing a message generated by the CPU 310 or the network interface 200. In such a case, the router 100 determines the adjacent node as the destination of the packet based on the dimension order of the specified virtual channel, and then transmits the packet to the adjacent node through the specified virtual channel. The router 100 receives a request packet having an address and data from any other node adjacent to its own node, transmits the request packet to a node adjacent to its own node located in nth dimension when a portion of the node address in nth dimension of its own node is not matched to a portion of the address in nth dimension of the request packet, transmitting the request packet to a node adjacent to its own node located in n+1th dimension when the address of nth dimension of its own node is matched to the address of nth dimension of the target node, receives a response packet having an address from any other node adjacent to its own node, transmitting the response packet to a node adjacent to its own node located in n+1th dimension when a portion of the node address of n+1th dimension of its own node is not matched to a portion of the address of n+1th dimension of the response packet, and transmits the response packet to a node adjacent to its own node located in nth dimension when the address of n+1th dimension of its own node is matched to the address of n+1th dimension of the response packet, wherein the router terminates a request packet when the address of the request packet is fully matched to the node address of its own node in all the dimensions, transfers the data conveyed by the request packet to the processor of its own node for processing, receives a response packet produced by the processor of its own node, and transmits the produced response packet to an adjacent node.

The network interface 200 controls data exchange between the CPU 310 and the mesh network. Also, the network interface 200 has a control function of the RDMA communication and a DMA transfer control function with the memory 320.

The router 100 and the network interface 200 may be mounted on the same board.

The CPU 310 performs an arithmetic calculation process based on a message and data input via the network interface 200. The CPU 310 also generates a message and data to be transmitted to another node, and then outputs the message and data together with a destination thereof to the network interface 200. Such a process is performed when the CPU 310 executes a program stored on the memory 320.

The memory 320 stores the program to be executed by the CPU 310, and a variety of data. The memory 320 performs data write and data read operations in response to a request from the CPU 310. The memory 320 can also perform data write and data read operations through the DMA transfer sequence in response to a request from the network interface 200. The CPU 310 processes data and produces a request packet and a response packet.

Figure 4:
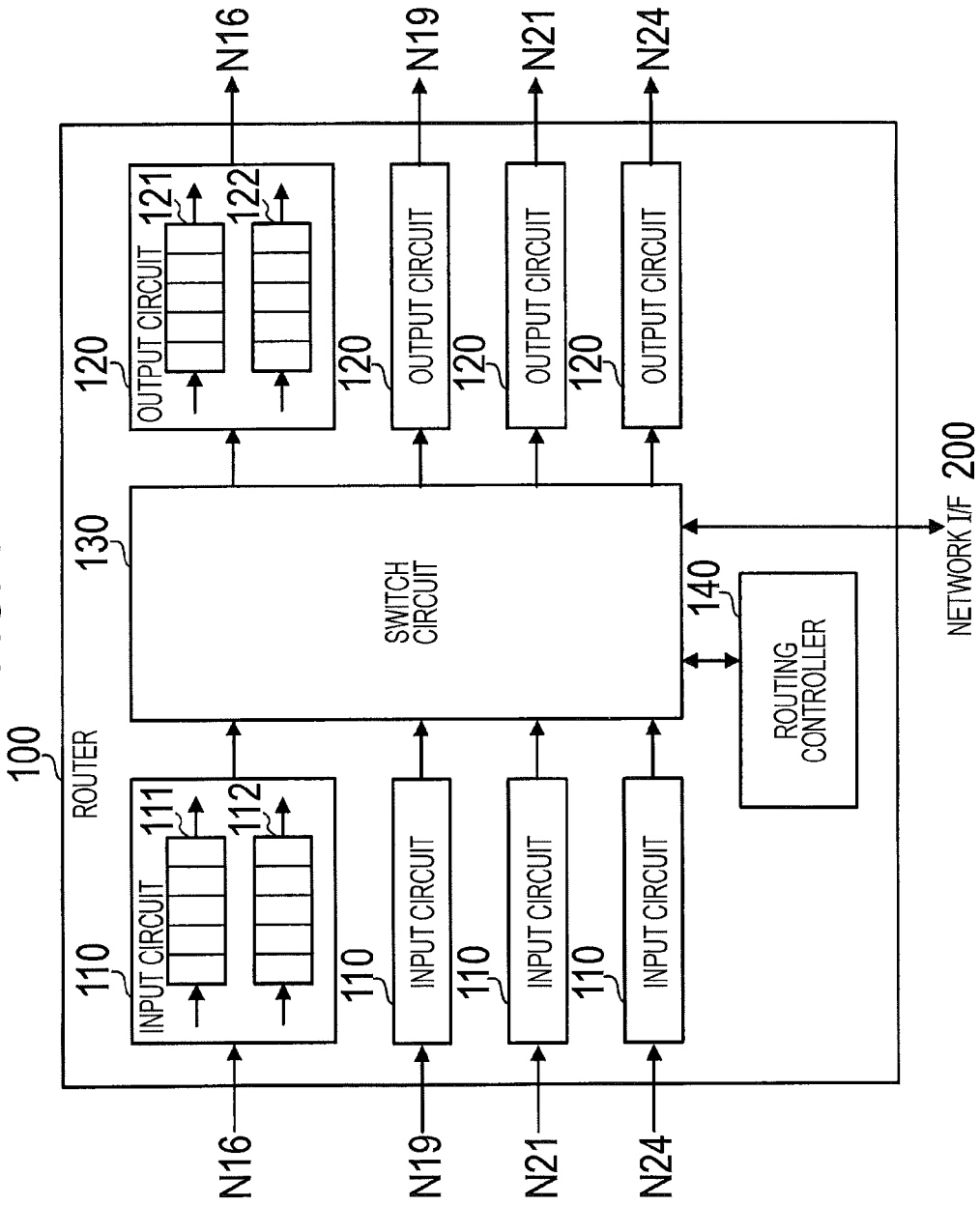
FIG. 4 illustrates an internal structure of a router.

FIG. 4 illustrates an internal structure of the router 100.

The router 100 includes input circuits 110, output circuits 120, switch circuit 130, and routing controller 140.

The number of input circuits 110 and the number of output circuits 120 are respectively equal to the number of adjacent nodes. The node N10 includes four input circuits 110 and four output circuits 120 as illustrated in FIG. 4. A combination of the input circuit 110 and the output circuit 120 is connected to one adjacent node.

Each input circuit 110 includes a buffer storing a packet input via the corresponding adjacent node. The buffer is logically partitioned into two logical buffer regions 111 and 112. The logical buffer region 111 serves as a reception cue for a request channel, and the logical buffer region 112 serves as a reception cue for a response channel.

Similarly, the output circuit 120 includes a buffer storing a packet to be output to the corresponding adjacent node. The buffer is logically partitioned into two logical buffer regions 121 and 122. The logical buffer region 121 serves as a transmission cue for the request channel, and the logical buffer region 122 serves as a reception cue for the response channel.

Under the control of the routing controller 140, the switch circuit 130 outputs a packet input from one of the input circuits 110 or a packet input via the network interface 200 to one of the output circuits 120 or the network interface 200.

The routing controller 140 controls an input-output switching process of the switch circuit 130. The routing controller 140 performs the routing operation in dimension orders mutually opposite from a packet transmit-receive process on the request channel to a packet transmit-receive process on the response channel.

Figure 5:
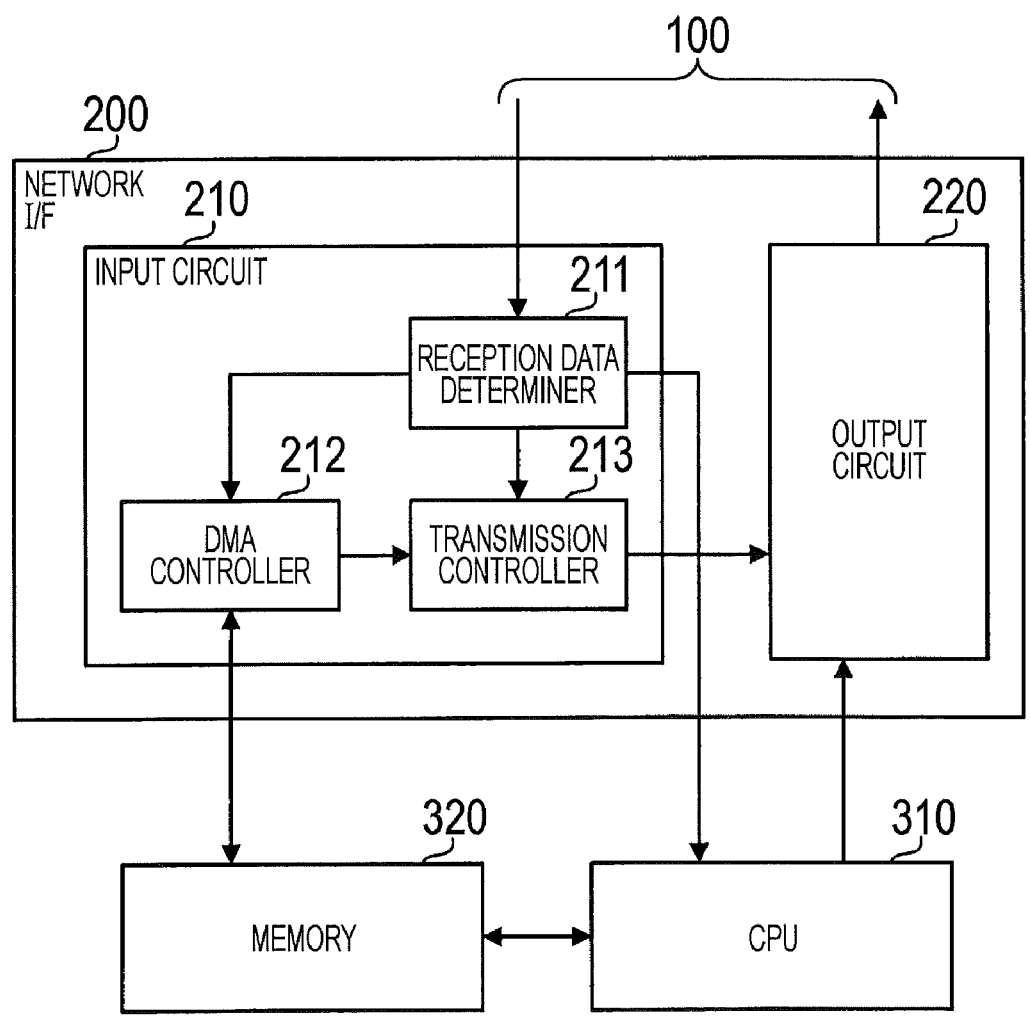
FIG. 5 illustrates an internal structure of a network interface.

FIG. 5 illustrates an internal structure of the network interface 200.

The network interface 200 includes an input circuit 210 receiving a packet from the router 100 and an output circuit 220 outputting a packet addressed to another node to the router 100.

The input circuit 210 has a function of executing a process on RDMA communication packets, from among the packets input to the router 100, i.e., a get request packet and a put packet. To perform the function, the input circuit 210 includes reception data determiner 211, DMA controller 212, and transmission controller 213.

The reception data determiner 211 determines a message contained in the packet input from the router 100. If the received packet is one of the get request packet and the put packet, the reception data determiner 211 requests the DMA controller 212 to perform a DMA transfer operation with the memory 320. If the received packet is the get request packet, the reception data determiner 211 requests the transmission controller 213 to transmit the get request packet. If the received packet is a packet other than the packets for the RDMA communication, the reception data determiner 211 outputs that packet to the CPU 310.

The DMA controller 212 performs the DMA transfer operation with the memory 320 in response to a request from the reception data determiner 211, and thus writes data onto the memory 320, or reads data from the memory 320. If the data is read from the memory 320, the DMA controller 212 outputs the data to the transmission controller 213.

The transmission controller 213 generates a get response packet containing the data from the DMA controller 212, and outputs the packet to the router 100 via the output circuit 220. The transmission controller 213 then designates to the router 100 an adjacent node as an output destination and a virtual channel to be used.

The output circuit 220 receives the packet from one of the CPU 310 and the transmission controller 213 and outputs the received packet to the router 100. The output circuit 220 is designed to designate to the router 100 the adjacent node as the destination of the packet and the virtual channel to be used in the transmission.

Figure 6:
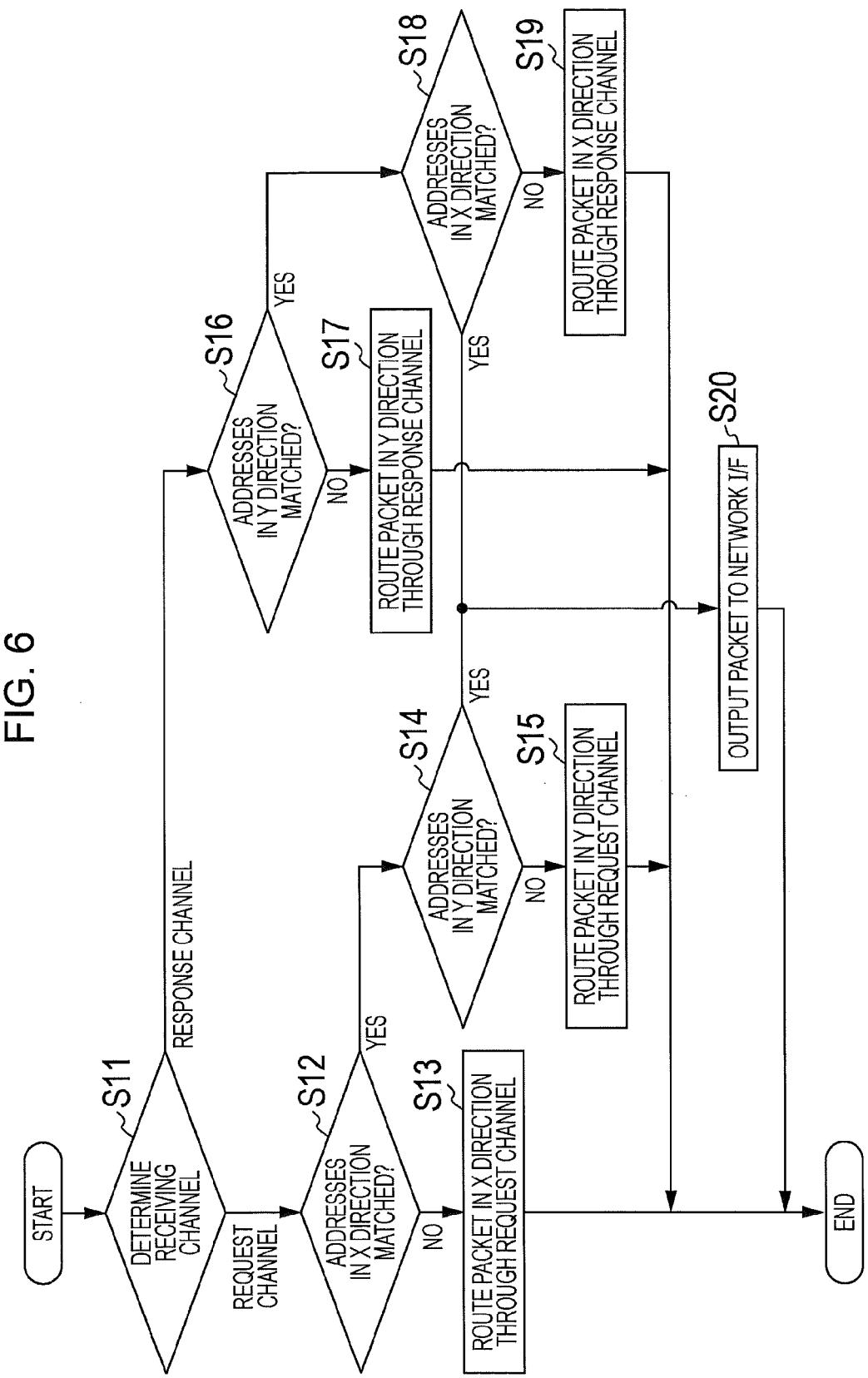
FIG. 6 is a flowchart of a routing process of the router.

FIG. 6 is a flowchart illustrating a routing process of the router 100. The process illustrated in FIG. 6 is performed each time a packet input to one of the input circuits 110 in the router 100 is supplied to the switch circuit 130.

Step 11: The routing controller 140 determines a reception channel of a packet. If the packet is received via the request channel, a process step in S12 is executed, and if the packet is received via the response channel, a process step in S16 is executed.

Step 12: The routing controller 140 references a destination address of the reception packet, and determines whether the destination address in the x direction matches the address of own node in the x direction. If the addresses match each other, a process step in step S14 is executed. If the addresses fail to match each other, a process step in step S13 is executed.

Step S13: The routing controller 140 routes the reception packet in the x direction via the request channel. More specifically, the routing controller 140 determines as a destination of the packet an adjacent node closer to the destination address than own node in the x direction, from among the adjacent nodes connected in the x direction. The routing controller 140 then controls the switch circuit 130 so that the packet is routed to the logical buffer region 121 in the output circuit 120 of the adjacent node.

Step S14: The routing controller 140 references the destination address of the reception packet, and determines whether the destination address in the y direction matches the address of own node in the y direction. If the addresses match each other, a process step in step S20 is executed. If the addresses fail to match each other, a process step in step S15 is executed.

Step S15: The routing controller 140 routes the reception packet in the y direction via the request channel. More specifically, the routing controller 140 determines as a destination of the packet an adjacent node closer to the destination address than own node in the y direction, from among the adjacent nodes connected in the y direction. The routing controller 140 then controls the switch circuit 130 so that the packet is routed to the logical buffer region 121 in the output circuit 120 of the adjacent node.

Step S16: The routing controller 140 references the destination address of the reception packet, and determines whether the destination address in the y direction matches the address of own node in the y direction. If the addresses match each other, a process step in step S18 is executed. If the addresses fail to match each other, a process step in step S17 is executed.

Step S17: The routing controller 140 routes the reception packet in the y direction via the request channel. More specifically, the routing controller 140 determines as a destination of the packet an adjacent node closer to the destination address than own node in the y direction, from among the adjacent nodes connected in the y direction. The routing controller 140 then controls the switch circuit 130 so that the packet is routed to the logical buffer region 122 in the output circuit 120 of the adjacent node.

Step 18: The routing controller 140 references a destination address of the reception packet, and determines whether the destination address in the x direction matches the address of own node in the x direction. If the addresses match each other, a process step in step S20 is executed. If the addresses fail to match each other, a process step in step S19 is executed.

Step S19: The routing controller 140 routes the reception packet in the x direction via the request channel. More specifically, the routing controller 140 determines as a destination of the packet an adjacent node closer to the destination address than own node in the x direction, from among the adjacent nodes connected in the x direction. The routing controller 140 then controls the switch circuit 130 so that the packet is routed to the logical buffer region 122 in the output circuit 120 of the adjacent node.

Step S20: The routing controller 140 controls the switch circuit 130 so that the reception packet is output to the network interface 200. The reception packet is thus input the input circuit 210 in the network interface 200. The network interface 200 is then notified of information indicating the adjacent node as the transmission source of the reception packet and information indicating the virtual channel used.

Through the above-described process, the packet received via the request channel is routed in the x direction with higher priority, and the packet received via the response channel is routed in the y direction with higher priority. More specifically, the dimension order opposite to the dimension order of the request channel is applied in the routing operation via the response channel. If a packet addressed to own node is received, that packet is supplied to the network interface 200.

Figure 7:
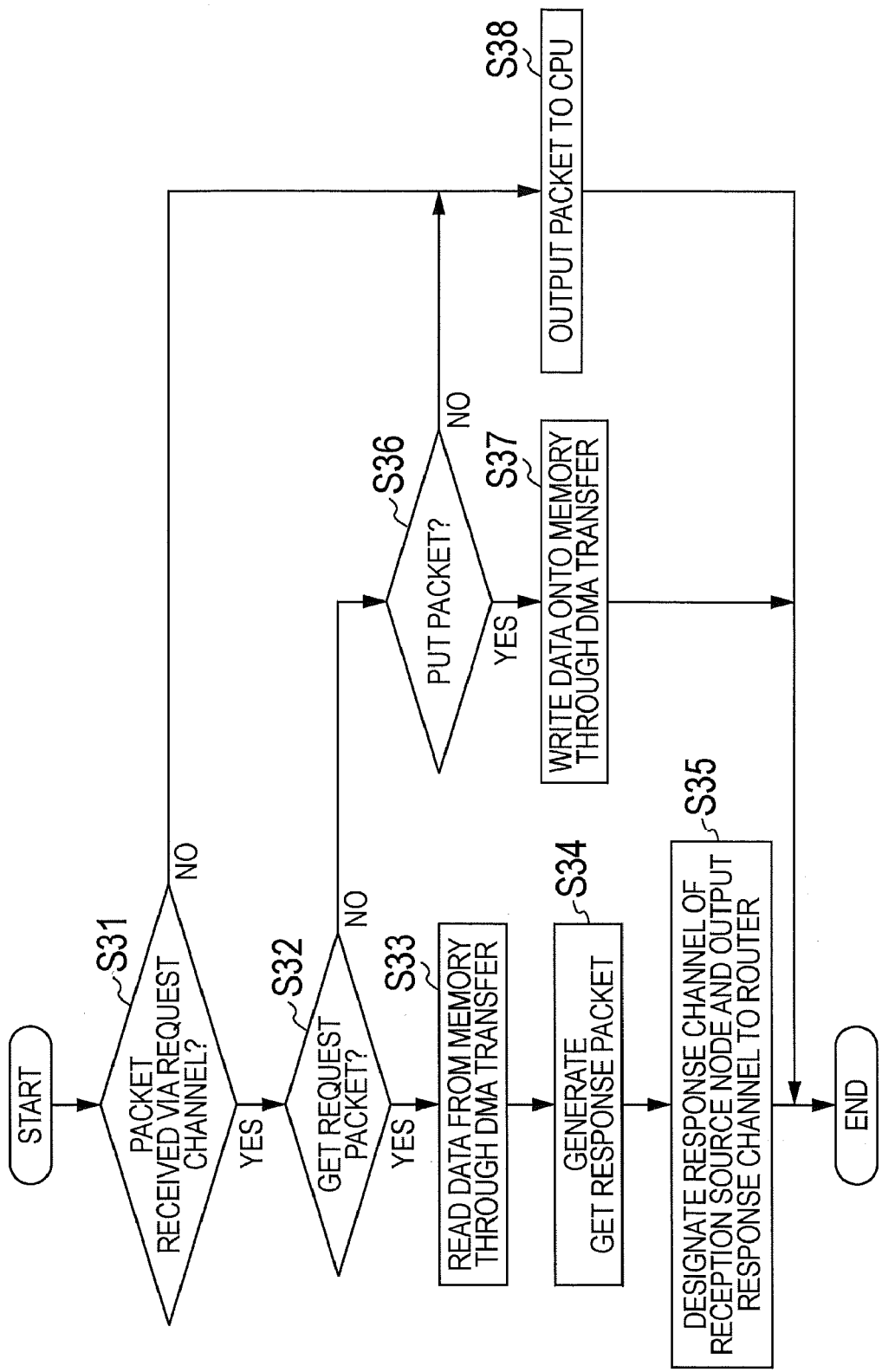
FIG. 7 is a flowchart of a network interface process performed when a reception packet is supplied by the router.

FIG. 7 is a flowchart of the process of the network interface 200 that receives the reception packet from the router 100.

Step S31: When the reception packet is input to the input circuit 210 in the network interface 200, the reception data determiner 211 determines based on the information from the router 100 whether the reception packet is received via the request channel. If the reception packet is received via the request channel, a process step S32 is executed. If the reception packet is received via the response channel, a process step in step S38 is executed.

Step S32: The reception data determiner 211 determines whether the reception packet is a get request packet. If the reception packet is a get request packet, the reception data determiner 211 notifies the DMA controller 212 of a read address contained in the reception packet and requests the DMA controller 212 to read data. The reception data determiner 211 extracts the address of the transmission source from the reception packet and notifies the transmission controller 213 of the extracted address of the transmission source. The reception data determiner 211 notifies the adjacent node of the transmission source of the reception packet. The reception data determiner 211 then requests the transmission controller 213 to transmit a get response packet. A process step in step S33 is then executed. If the reception packet is not a get request packet, a process step in step S36 is executed.

Step S33: The DMA controller 212 accesses the memory 320, and reads, through the DMA transfer sequence, data stored as the read address notified of by the reception data determiner 211. The DMA controller 212 then outputs the data to the transmission controller 213.

Step S34: The transmission controller 213 generates a get response packet containing the data read from the DMA controller 212. The address of the transmission source node of the get request packet notified of by the reception data determiner 211 is set to be a destination address of the get response packet.

Step S35: The transmission controller 213 supplies the generated get response packet to the output circuit 220 to output the get response packet to the router 100. The transmission controller 213 requests the router 100 through the output circuit 220 to set the virtual channel of the transmission destination of the get response packet to be the response channel connected to the adjacent node of the transmission source of the reception packet. The router 100 thus transfers the get response packet received from the network interface 200 to the logical buffer region 122 of the output circuit 120 of the adjacent node of the transmission source of the get request packet.

Step S36: The reception data determiner 211 determines whether the reception packet is a put packet. If the reception packet is a put packet, the reception data determiner 211 notifies the DMA controller 212 of a write address and write data, contained in the reception packet, and requests the DMA controller 212 to write the write address and the write data onto the memory 320. A process step in step S37 is then executed. If the reception packet is not a put packet, a process step in step S38 is also executed.

Step S37: The DMA controller 212 accesses the memory 320, and writes the write data on the write address, notified of by the reception data determiner 211, on the memory 320 through the DMA sequence. After the data is written, the CPU 310 may be notified by the input circuit 210 that the data writing has been completed.

Step S38: The reception data determiner 211 outputs the reception packet to the CPU 310.

Through the above-described process steps, the network interface 200 causes designated data to be read from the memory 320 in response to the reception of the get request packet via the response channel, and the get response packet is then returned. The response process to the get request is automatically performed without affecting the other processing on the CPU 310. Since the get response packet is routed via the response channel, the transmission path of the get request packet and the transmission path of the get response packet becomes the same. The get response packet is reliably returned to the request source node.

When the get response packet is transmitted, the response channel may be designated as the transmission channel, and the same node as the node of the transmission source may be designated as the adjacent node for the transmission destination. The network interface 200 is thus free from a complex process of determining an optimum communication plane. The network interface 200 is reduced in circuit scale and manufacturing costs.

The parallel computer features fault robustness in the RDMA communications with the network interface 200 mounted on each of the nodes N1-N16. The parallel computer with fault robustness is thus provided without an increase in circuit scale and an increase in manufacturing costs.

The output circuit 220 in the network interface 200 has a function of controlling the enable/disable transmission of the packet input via one of the transmission controller 213 and the CPU 310 to the router 100. If the transmission of the packet is disabled, the output circuit 220 causes the router 100 to stop inputting the packet to the input circuit 210 in the network interface 200.

Figure 8:
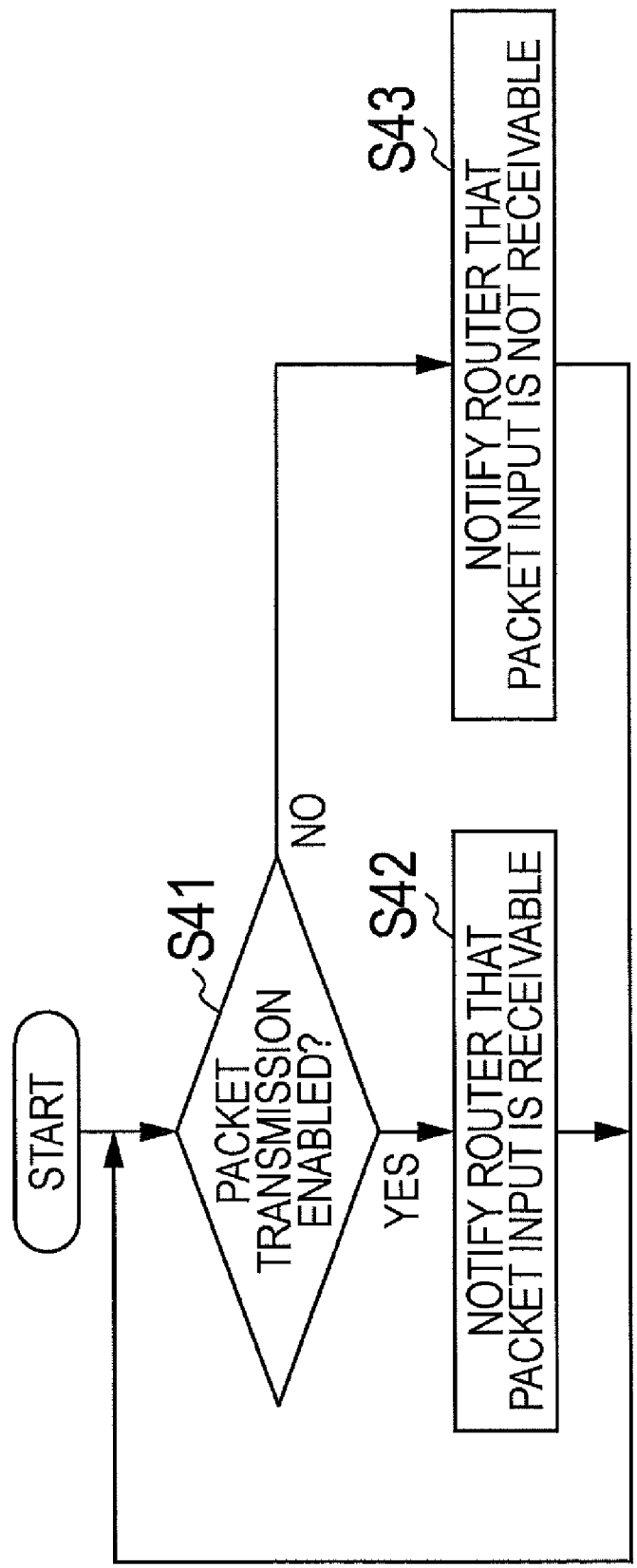
FIG. 8 is a flowchart of a management process of determining whether an output circuit is to transmit a packet.

FIG. 8 is a flowchart illustrating a control process of the enable/disable transmission by the output circuit 220.

Step S41: The output circuit 220 determines whether a packet transmission is enabled. If the packet transmission is enabled, a process step in step S42 is executed. If the packet transmission is disabled, a process step in step S43 is executed.

Step S42: The output circuit 220 notifies the router 100 that the inputting of a new packet to the input circuit 210 in the network interface 200 is enabled. If a packet addressed to own node is received from the adjacent node under this state, the router 100 inputs the packet to the input circuit 210 in the network interface 200. The process step in step S41 is then executed again.

Step S43: The output circuit 220 notifies the router 100 that the inputting of a new packet to the input circuit 210 in the network interface 200 is disabled. Even if a packet addressed to own node is received from the adjacent node under this state, the router 100 does not supply the packet to the input circuit 210 in the network interface 200. The reception operation of a new packet on the virtual channel having received that packet is suspended.

The process step in step S41 is executed in order to request the router 100 to output the packet input to the output circuit 220 to the virtual channel designated as a transmission destination. If no empty logical region corresponding to the virtual channel of the transmission destination is available, the packet transmission is determined to be disabled.

The process step in step S41 may be determined depending on whether space is available in an output cue in a transmission packet applied to the output circuit 220. If no space is available in the output cue in the transmission packet, the transmission of the packet is determined to be disabled. If header data of the output cue is output to the logical buffer region corresponding to the virtual channel of the transmission destination, space develops in the output cue and the packet transmission is enabled.

FIG. 8 illustrates a process applied when a response to the get request packet is generated. If the transmission of the get response packet is disabled, the reception of subsequent packets containing a new get request packet is suspended. If the reception of the subsequent packets is suspended, no deadlock occurs.

The get request packet and the get response packet are routed on the same virtual channel in a network. A deadlock occurs in the network if the transmission of the get response packet is disabled on a given node followed by the suspension of the reception of a new get request packet on that node. This is because a loop containing the get response packet and a subsequent get request packet is created on the same virtual channel.

To overcome such a problem, the transmission-disabled get response packet may be deleted in one method, or one of the transmission-disabled get response packet and the subsequent get request packet may be stored on a memory in another method. In the former method, the transmission source node is unable to receive a response to the get request packet and thus needs a function of retransmission of the get request packet. In the latter method, the network interface 200 may include a high-volume memory for storing packets or may transfer the get response packet to the CPU 310 at an interrupt and request the CPU 310 to perform a subsequent transmission operation.

In contrast, the first embodiment is free from the deadlock attributed to the suspension of the reception of the subsequent packets because the get response packet and the get request packet are routed via different virtual channels. The network interface 200 resumes the reception of the subsequent packets if the transmission via the response channel of the transmission destination of the get request packet is enabled. In accordance with the first embodiment, the transmission enable/disable control is thus simplified. The network interface 200 is reduced in circuit scale and manufacturing costs.

Second Embodiment

Figure 9:
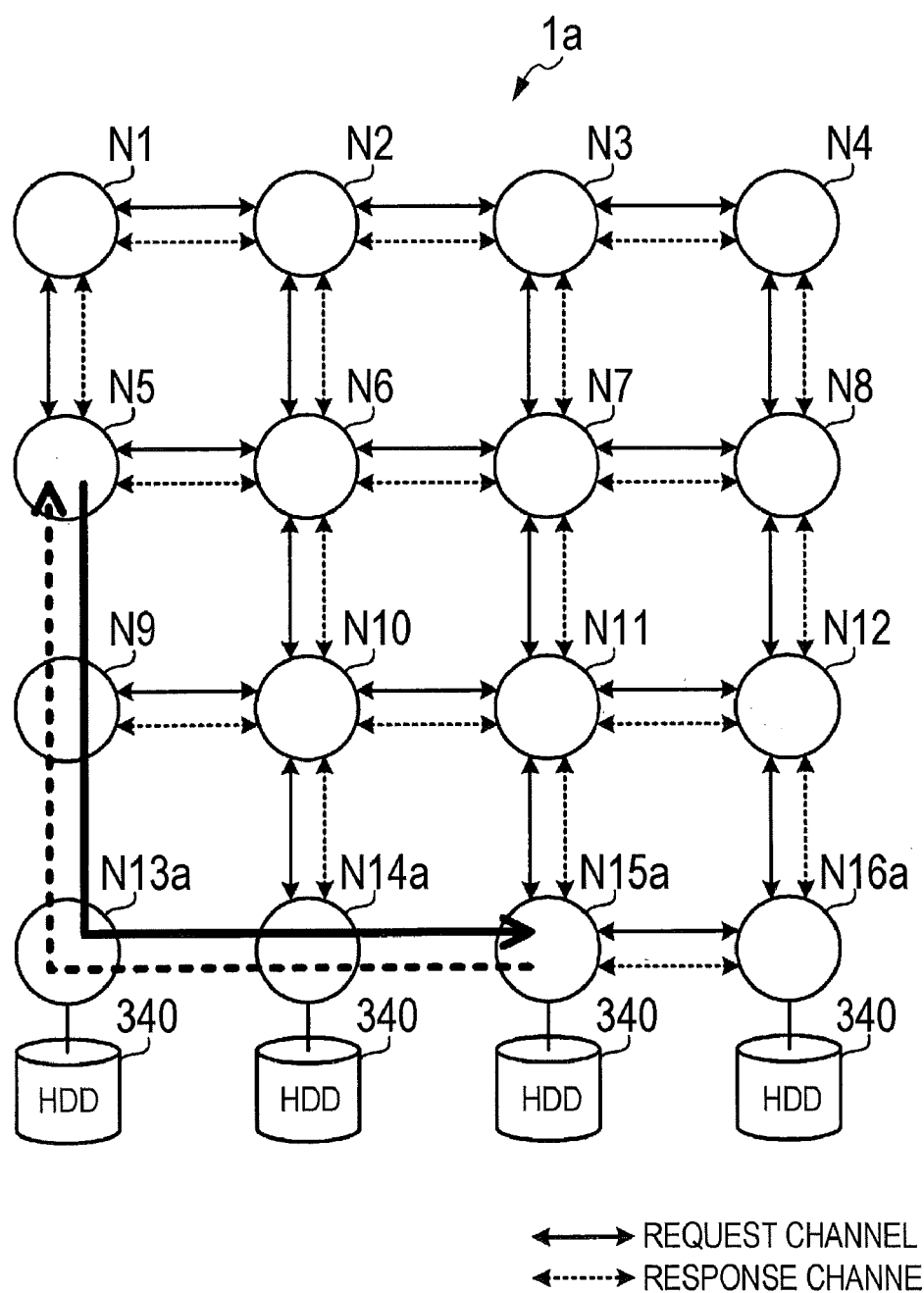
FIG. 9 illustrates a structure of a parallel computer in accordance with a second embodiment of the present invention.

FIG. 9 is a block diagram diagrammatically illustrating a parallel computer 1a in accordance with a second embodiment of the present invention.

The parallel computer 1a illustrated in FIG. 9 is constructed by modifying the nodes N13-N16 in the parallel computer 1 illustrated in FIG. 1 to be nodes N13a-N16a dedicated to input-output operations of data. The nodes N13a-N16a are respectively connected to a hard-disk drive (HDD) 340. Each of the nodes N13a-N16a is identical in structure to the node N10 illustrated in FIG. 3 except that the HDD 340 is further connected to the bus 330. As illustrated in FIG. 9, the nodes N1-N12 are computing nodes. Each of the nodes N1-N12 and N13a-N16a of the parallel computer 1a has the same routing function and the RDMA communication function identical to those supported by each of the nodes N1-N16 of the parallel computer 1 illustrated in FIG. 1.

Each of the nodes N1-N12 and N13a-N16a of the parallel computer 1a can select any virtual channel for transmission when a packet generated by the CPU 310 is transmitted to another node. This feature also holds true of the first embodiment.

In accordance with the second embodiment, the virtual channel for transmission and the virtual channel for reception are different in dimension order from each other when a packet (excluding an RDMA communication packet) is exchanged between an input-output dedicated node and a computing node. For example, a packet is transmitted from a computing node to an input-output dedicated node via the request channel, and a packet is transmitted from the input-output dedicated node to the computing node via the response channel. The CPU 310 selects the transmission channel by executing each program stored on one of the memory 320 and the HDD 340 on the corresponding node.

The selection process of the transmission channel thus reduces the number of computing nodes through which each packet is routed. For example, a communication operation between the node N5 and the node N15a illustrated in FIG. 9 is now considered. The routing in the y direction has a higher priority on the request channel (vertical direction in FIG. 9), and the routing in the x direction has a higher priority on the response channel (horizontal direction in FIG. 9).

In the packet transmission from the node N5 to the node 15a, the packet is routed through the nodes N9, N13a, N14a, and N15a on the request channel. If the packet transmission from the node N15a to the node N5 is performed on the request channel, the packet is routed through the nodes N11, N7, N6, and N5 in that order. In this case, the packet is routed through three nodes.

The packet transmission from the input-output dedicated node to the computing node may be performed using the response channel now. The packet addressed to the node N5 from the node N15a is routed via nodes N14a, N13a, N9, and N5 in that order. The number of computing nodes the packet has routed through is one, namely, only the node N9, in this case.

By reducing the number of computing nodes the packet is routed through, a transfer process load at each computing node is lowered. The process load caused by the packet transmission originated at a computing node, the reception of the packet addressed to a computing node, and the communication between the computing nodes is reduced. As a result, the effect of the routing process of the packet on the computing process at the computing node is also reduced. The entire process efficiency of the parallel computer 1a is increased.

Third Embodiment

Figure 10:
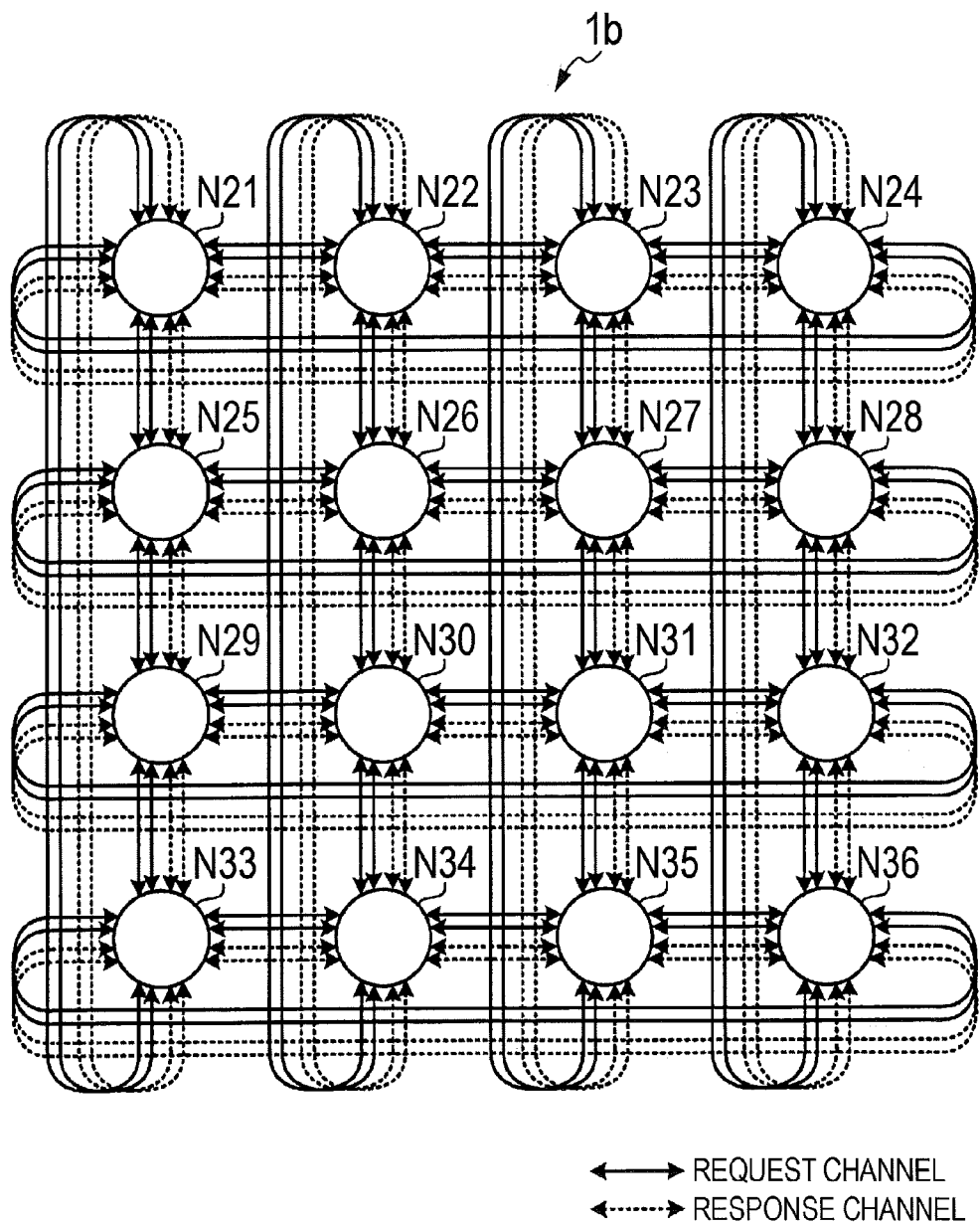
FIG. 10 illustrates a structure of a parallel computer in accordance with a third embodiment of the present invention.

FIG. 10 illustrates a structure of a parallel computer 1b of a third embodiment.

The parallel computer 1b illustrated in FIG. 10 includes 16 nodes N21-N36 connected in a two-dimensional 4×4 torus configuration, thereby forming a torus network. Any two adjacent nodes of the node N21-N36 are connected to each other by at least two types of virtual channels in the x direction (horizontal direction in FIG. 10) and the y direction (vertical direction in FIG. 10). One of the two channels is a request channel and the other is a response channel. In the same manner as in the first embodiment, the dimension order of the routing on the request channel is opposite to the dimension order of the routing on the response channel.

At least two virtual channels on which the routing operation of the same dimension order is performed are preferably set up in order to prevent a deadlock in the torus network. In the parallel computer 1b illustrated in FIG. 10, the adjacent nodes are connected via two request channels and two response channels.

Since the transmission channels are appropriately switched in accordance with any known process between the virtual channels of the same type, the deadlock is thus avoided. More specifically, when a packet is routed via one request channel beyond a node connection loop, the packet destination is switched to the other request channel. Similarly, when a packet is routed via one response channel beyond a node connection loop, the packet destination is switched to the other response channel.

The nodes N21-N36 are thus switched between the virtual channels of the same type. The rest of the functions of the nodes N21-N36 are identical to the functions of the nodes N1-N16 of the first embodiment. The nodes N21-N36 have also the same RDMA communication function as that of the nodes N1-N16 of the first embodiment. The nodes N21-N36 automatically responds via the response channel to a get request packet received via the request channel in the same manner as the nodes N1-N16 of the first embodiment. The fault robustness of the get communication is increased without any an increase in the circuit scale and the manufacturing costs of the nodes N21-N36.

The nodes N21-N36 control the packet enable/disable transmission in the same process as the process illustrated in FIG. 8. As illustrated in FIG. 9, some of the nodes may be set as input-output dedicated nodes, and the packet transmission from a computing node to an input-output dedicated node and the packet transmission from the input-output dedicated node to the computing node may be performed using different types of virtual channels.

With reference to each of the above-described embodiments, the process of each node in the two-dimensional mesh network and the two-dimensional torus network is described. The present invention is not limited to this arrangement. The routing function and the RDMA communication function may be implemented on each node in three-dimensional or higher dimensional mesh and torus networks.

A part of the functions of each node can be implemented by the computer. In such a case, a program describing the process content of such function is provided. The computer executes the program, thereby performing the above-described function. The program describing the process content may be recorded on a computer readable recording medium. The computer readable recording media includes a magnetic recording device, an optical disk, a magneto-optical recording medium, a semiconductor memory, etc.

To supply the program to users, a removable recording medium, such as an optical disk, storing the program is set to be commercially available. Alternatively, the program may be stored on a storage device of a server computer, and then transferred to another computer from the server computer.

The computer executing the program installs onto own storage unit the program from the removable recording medium or the program transferred from the server computer. Reading the program from own storage unit, the computer executes a process responsive to the program. The computer can read the program directly from the removable recording medium and execute the process responsive to the program.

The computer can execute the process responsive to the program each time the program is received from the server computer.

The information processing system causes the process request data requesting the response to be transmitted to the computing node as the request source and the response data to be reliably transmitted and received between the computing nodes.

The communication control apparatus reliably transmits in a simple process the response data responsive to the process request data to the computing node as the request source.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A system comprising:
   a plurality of nodes connected in a multi-dimensional matrix and having node addresses, respectively,
   each of the nodes comprising:
   a processor for processing data and producing a request packet and a response packet; and
   a router for receiving a request packet having an address of a target node and data from any other node adjacent to its own node, transmitting the request packet to a node adjacent to its own node located in nth dimension when a portion of the node address in nth dimension of its own node is not matched to a portion of the address in nth dimension of the request packet, transmitting the request packet to a node adjacent to its own node located in n+1th dimension when the address of nth dimension of its own node is matched to the address of nth dimension of the request packet, receiving a response packet having an address from any other node adjacent to its own node, transmitting the response packet to a node adjacent to its own node located in n+1th dimension when a portion of the node address of n+1th dimension of its own node is not matched to a portion of the address of n+1th dimension of the response packet, and transmitting the response packet to a node adjacent to its own node located in nth dimension when the address of n+1th dimension of its own node is matched to the address of n+1th dimension of the response packet,
   wherein the router terminates a request packet when the address of the request packet is fully matched to the node address of its own node in all the dimensions, transfers the data conveyed by the request packet to the processor of its own node for processing, receives a response packet produced by the processor of its own node, and transmits the produced response packet to an adjacent node.

2. The system of claim 1, wherein the node further comprises a reception data determiner for determining whether the request packet is a process request data that a computing node of a request source needs as a response.

3. The system of claim 2, wherein the node further comprises a response controller for controlling a transmission process of the response packet.

4. The system of claim 2, wherein the process request data is a request for reading out data from a memory included in the nodes, and for transmitting the data read from the memory to a request source node.

5. The system of claim 4, wherein the node further comprises a computing node for executing data transmission between the memory.

6. The system of claim 4, wherein the response controller reads out data from the memory directly and transmits the data when receiving the process request data.

7. The system of claim 1 wherein the node further comprises a data generating unit for generating transmitting data.

8. An apparatus connected to a processor for processing data and producing a request packet and a response packet, the apparatus and the processor are included in a node having a node address, the node is connected to a plurality of nodes connected in a multi-dimensional matrix having node addresses, respectively, the apparatus comprising:
   a receiving unit for receiving a request packet from any other node adjacent to its own node; and
   a controller for transmitting the request packet to a node adjacent to its own node located in nth dimension when a portion of the node address in nth dimension of its own node is not matched to a portion of a destination address in nth dimension of the request packet, transmitting the request packet to a node adjacent to its own node located in n+1th dimension when the address of nth dimension of its own node is matched to the destination address of nth dimension of the target node,
   wherein the receiving unit receives a response packet having an address from any other node adjacent to its own node, and the controller transmits the response packet to a node adjacent to its own node located in n+1th dimension when a portion of the node address of n+1th dimension of its own node is not matched to a portion of a destination address of n+1th dimension of the response packet, and transmits the response packet to a node adjacent to its own node located in nth dimension when the address of n+1th dimension of its own node is matched to the destination address of n+1th dimension of the response packet.

9. The apparatus of claim 8, wherein the controller terminates a request packet when the address of the request packet is fully matched to the node address of its own node in all the dimensions, transfers the data conveyed by the request packet to the processor of its own node for processing, receives a response packet produced by the processor of its own node, and transmits the produced response packet to an adjacent node.

10. The apparatus of claim 8, further comprising a reception data determiner for determining whether the request packet is a process request data that a computing node of a request source needs as a response.

11. The apparatus of claim 10, further comprising a response controller for controlling a transmission process of the response packet.

12. The apparatus of claim 10, wherein the process request data is for reading out data from a memory included in the nodes, and transmitting the data to a request source node.

13. A method of controlling a system including a plurality of nodes connected in a multi-dimensional matrix and having node addresses, respectively, the method comprising;

processing data and producing a request packet or a response packet by a processor;

receiving a request packet from any other node adjacent to its own node by a router;

transmitting the request packet to a node adjacent to its own node located in nth dimension when a portion of the node address in nth dimension of its own node is not matched to a portion of the destination address in nth dimension of the request packet by the router, or transmitting the request packet to a node adjacent to its own node located in n+1th dimension when the address of nth dimension of its own node is matched to the address of nth dimension of the target node by the router;

receiving a response packet having an address from any other node adjacent to its own node, transmitting the response packet to a node adjacent to its own node located in n+1th dimension when a portion of the node address of n+1th dimension of its own node is not matched to a portion of the address of n+1th dimension of the response packet by the router; and transmitting the response packet to a node adjacent to its own node located in nth dimension when the address of n+1th dimension of its own node is matched to the address of n+1th dimension of the response packet by the router.

14. The method of claim 13, further comprising:

terminating a request packet when the address of the request packet is fully matched to the node address of its own node in all the dimensions, transferring the data conveyed by the request packet to the processor of its own node for processing, receiving a response packet produced by the processor of its own node, and transmitting the produced response packet to an adjacent node.

15. The method of claim 13 further comprising:

determining whether the request packet is a process request data that a computing node of a request source needs as a response.

16. The method of claim 15, wherein the process request data is for reading out data from a memory included in the nodes, and transmitting the data to a request source node.

17. A system comprising:

a plurality of nodes connected to an adjacent node through a plurality of virtual channels in a multi-dimensional matrix and having node addresses, respectively, each of the nodes comprising:

a processor for processing data and producing a request packet and a response packet; and a router for communicating with the other nodes through the virtual channels, the router transmits a request packet and a response packet both including a destination address indicating a target node to an adjacent node, the router transmits the request packet to the adjacent node located in a first dimension through a first virtual channel when a portion of the node address in the first dimension of its own node is not matched to a portion of the destination address in the first dimension, and transmits the request packet to an adjacent node located in a second dimension through the first virtual channel when the address of the first dimension of its own node is matched to the destination address of the first dimension and its own node is not the target node, and the router transmits the response packet to an adjacent node located in the second dimension through a second virtual channel when a portion of the node address of the second dimension of its own node is not matched to a portion of the destination address of the second dimension, and transmits the response packet to an adjacent node located in the second dimension through the second channel when the address of the second dimension of its own node is matched to the destination address of the second dimension and its own node is not the target node.

* * * * *